（12）United States Patent
Koeppel et al.

(10) Patent No.: US 10,157,364 B1
(45) Date of Patent: Dec. 18, 2018

(54) ORDER IDENTIFICATION AND FULFILLMENT BASED ON VEHICLE MONITORING

(71) Applicant: Capital One Services, LLC, McLean, VA (US)

(72) Inventors: Adam Koeppel, Washington, DC (US); Robert Perry, Ashburn, VA (US)

(73) Assignee: Capital One Service, LLC, McLean, VA (US)

( * ) Notice: Subject to any disclaimer, the term of this patent is extended or adjusted under 35 U.S.C. 154(b) by 0 days.

(21) Appl. No.: 15/904,079

(22) Filed: Feb. 23, 2018

(51) Int. Cl.
G06Q 10/08 (2012.01)
H04W 4/029 (2018.01)
G06Q 30/06 (2012.01)
G06Q 20/32 (2012.01)
H04W 4/40 (2018.01)

(52) U.S. Cl.
CPC ....... G06Q 10/0836 (2013.01); G06Q 10/083 (2013.01); G06Q 20/3224 (2013.01); G06Q 30/0613 (2013.01); G06Q 30/0639 (2013.01); H04W 4/029 (2018.02); H04W 4/40 (2018.02)

(58) Field of Classification Search
CPC ............. G06Q 10/083; G06Q 20/3224; G06Q 30/0613; G06Q 30/0639; G06Q 10/0836; H04W 4/029; H04W 4/40
USPC ........................................................ 705/330
See application file for complete search history.

(56) References Cited

U.S. PATENT DOCUMENTS 6,547,133 B1    4/2003  DeVries, Jr. et al.

| 2008/0029595 | A1* | 2/2008 | Waller ................. G06Q 10/087 235/383 |
| 2010/0280956 | A1  | 11/2010 | Chutorash et al. |
| 2011/0145053 | A1* | 6/2011 | Hashim-Waris ............................ G06Q 30/0235 705/14.35 |
| 2014/0074743 | A1* | 3/2014 | Rademaker ............ G06Q 50/28 705/334 |
| 2017/0200218 | A1* | 7/2017 | Napper .............. G06Q 30/0635 |

(Continued)

OTHER PUBLICATIONS

Mahar et. al. "Using online pickup site inclusion policies to manage demand in retail/E-tail organizations"; Computers & Operations Research 39, 991-999, Jul. 8, 2011 (Year: 2011).*

(Continued)

Primary Examiner — Kevin H Flynn
Assistant Examiner — Emmett K. Walsh
(74) Attorney, Agent, or Firm — Harrity & Harrity, LLP

(57) ABSTRACT

A device may monitor, based on location information, a proximity of a vehicle and a third party location of a third party using a set of sensors. The location information may have been received from the vehicle. The location information may identify a location of the vehicle and the third party location. The device may process personal information to determine that an order is associated with the vehicle or an individual associated with the vehicle. The personal information may have been received from the vehicle. The device may receive, via another device associated with the vehicle or the individual, confirmation to complete a transaction for the order. The device may perform a first action to complete the transaction. The device may perform a second action to facilitate a good or a service associated with the order to be delivered to the vehicle in association with performing the first action.

20 Claims, 6 Drawing Sheets

(56) References Cited

U.S. PATENT DOCUMENTS

2018/0012279 A1* 1/2018 Ricci ................ G06Q 30/0625
2018/0097643 A1* 4/2018 Raleigh ................ H04L 12/14

OTHER PUBLICATIONS

Hernandez, "Are in-car payments innovative?", mobile payments today, https://www.mobilepaymentstoday.com/blogs/are-in-car-payments-innovative/, Jan. 20, 2017, 11 pages.

Porche, "In-car payments: A wallet that's truly mobile", creditcards.com, https://www.creditcards.com/credit-card-news/in-car-payments-truly-mobile-wallet.php, Feb. 13, 2017, 8 pages.

Fox News, "Company lets drive-thru customers pay for fast food with E-ZPass", http://www.foxnews.com/food-drink/2013/12/16/company-lets-drive-thru-customers-pay-for-fast-food-with-e-zpass.html, Dec. 16, 2013, 8 pages.

Wikipedia, "AmazonFresh", https://en.wikipedia.org/wiki/AmazonFresh, Feb. 23, 2018, 2 pages.

* cited by examiner

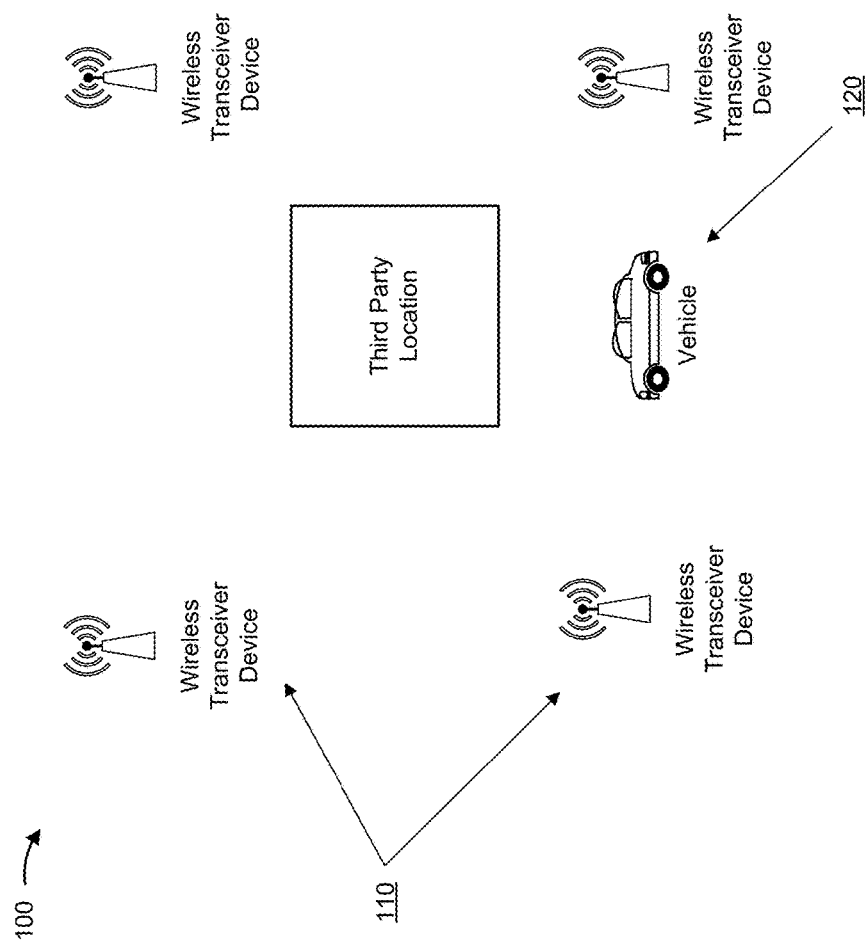

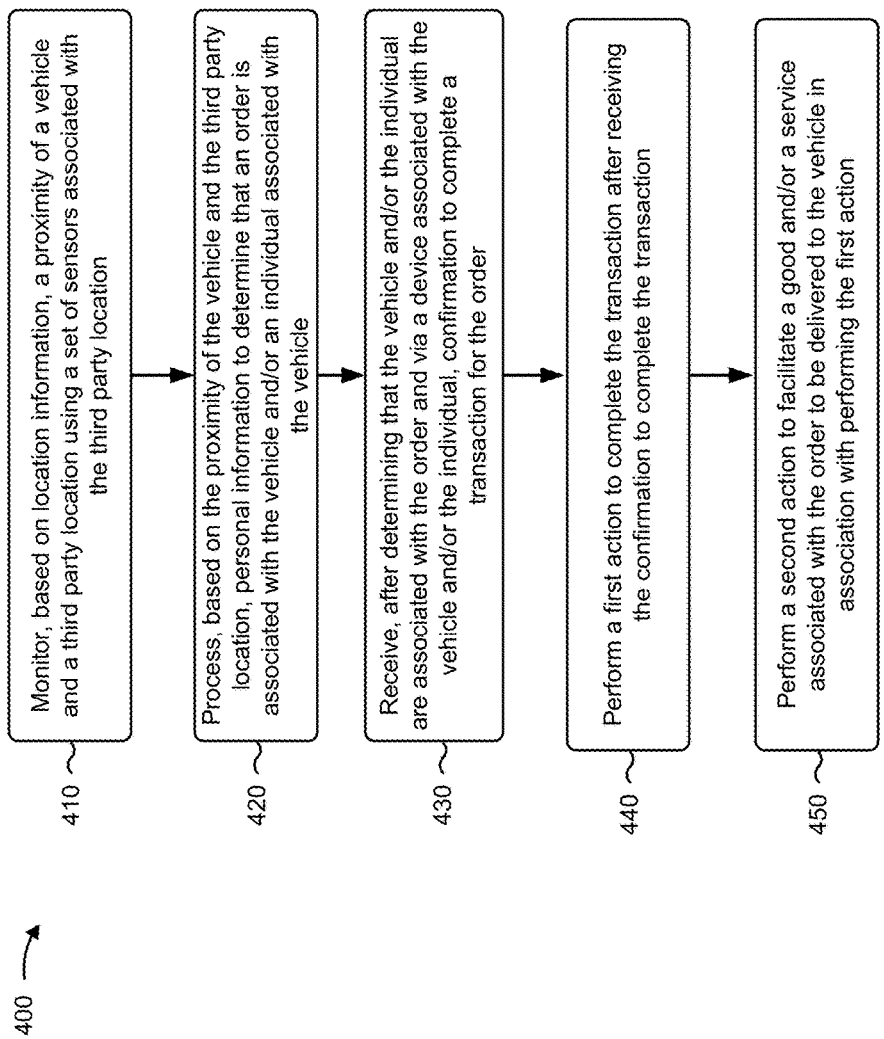

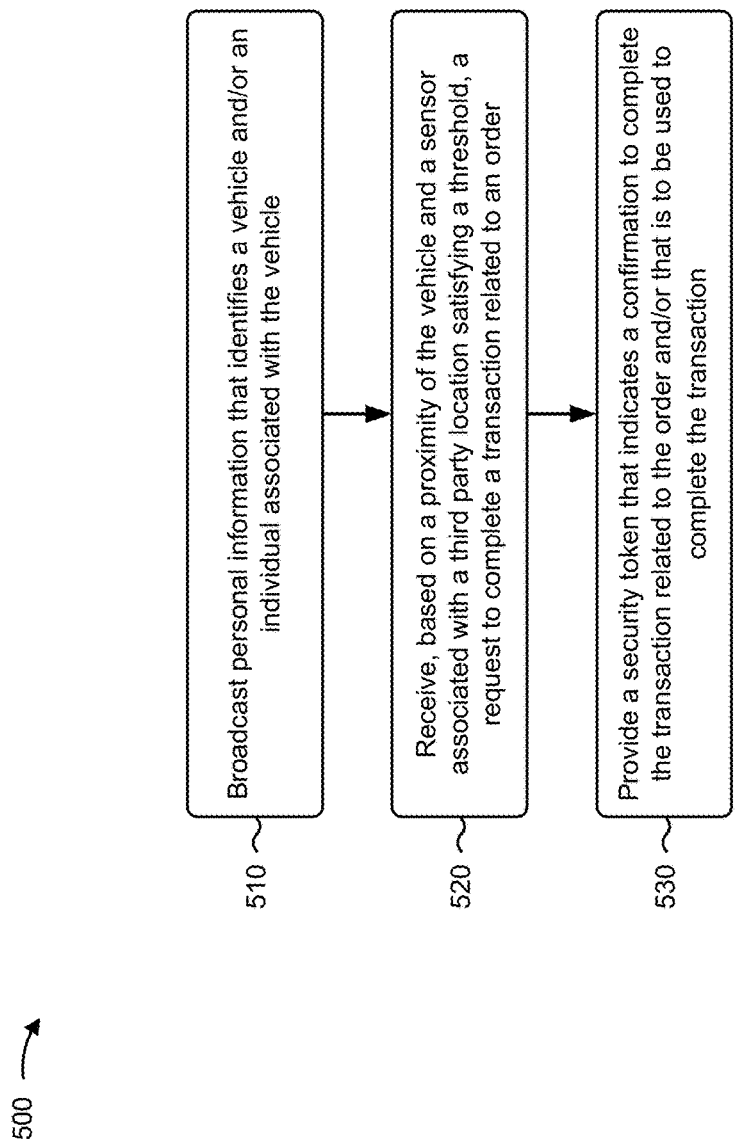

US 10,157,364 B1

ORDER IDENTIFICATION AND FULFILLMENT BASED ON VEHICLE MONITORING

BACKGROUND

Some organizations permit customers to place an order for a good and/or a service online and to receive delivery of the good and/or the service by driving to a location of the organization when the good and/or the service is ready. For example, a grocery store may permit customers to order groceries online and to pick up the groceries at the grocery store after an employee of the grocery store has gathered together the items for the order.

SUMMARY

According to some possible implementations, a device may comprise one or more memories; and one or more processors, communicatively coupled to the one or more memories, to monitor, based on location information, a proximity of a vehicle and a third party location of a third party using a set of sensors associated with the third party location. The location information may have been received from the vehicle. The location information may identify a location of the vehicle and the third party location. The one or more processors may process, based on the proximity of the vehicle and the third party location, personal information to determine that an order is associated with the vehicle or an individual associated with the vehicle. The personal information may have been received from the vehicle. The one or more processors may receive, after determining that the vehicle or the individual are associated with the order and via another device associated with the vehicle or the individual, confirmation to complete a transaction for the order. The one or more processors may perform a first action to complete the transaction after receiving the confirmation to complete the transaction. The one or more processors may perform a second action to facilitate a good or a service associated with the order to be delivered to the vehicle in association with performing the first action.

According to some possible implementations, a non-transitory computer-readable medium may store one or more instructions that, when executed by one or more processors, may cause the one or more processors to monitor, based on location information, a proximity of a vehicle and a third party location of a third party using a set of sensors associated with the third party location. The location information may have been received from the vehicle. The location information may identify a location of the vehicle and the third party location. The one or more instructions, when executed by the one or more processors, may cause the one or more processors to process, based on the proximity of the vehicle and the third party location, personal information to determine that an order is associated with the vehicle or an individual associated with the vehicle. The personal information may have been received from the vehicle. The one or more instructions, when executed by the one or more processors, may cause the one or more processors to provide, to a device, a notification for display that indicates that the individual or the vehicle are associated with the order after processing the personal information. The device may be associated with the individual or the vehicle.

The one or more instructions, when executed by the one or more processors, may cause the one or more processors to receive, after providing the notification for display, confirmation to complete a transaction for the order. The one or more instructions, when executed by the one or more processors, may cause the one or more processors to perform a first action to complete the transaction after receiving the confirmation to complete the transaction. The one or more instructions, when executed by the one or more processors, may cause the one or more processors to perform a second action to facilitate a good or a service associated with the order to be delivered to the vehicle in association with performing the first action.

According to some possible implementations, a method may include monitoring, by a device and based on location information, a proximity of a vehicle and a third party location of a third party using a set of sensors associated with the third party. The location information may have been received from the vehicle. The location information may identify a location of the vehicle or the third party location. The method may include determining, by the device, that the proximity of the vehicle and the third party location satisfies a threshold based on monitoring the proximity of the vehicle and the third party location.

The method may include processing, by the device, personal information to determine that an order is associated with the vehicle or an individual associated with the vehicle based on determining that the proximity of the vehicle and the third party location satisfies the threshold. The personal information may have been received from the vehicle. The method may include receiving, by the device and after determining that the vehicle or the individual are associated with the order, confirmation to complete a transaction for the order. The method may include performing, by the device, a first action to complete the transaction after receiving the confirmation to complete the transaction. The method may include performing, by the device, a second action to facilitate a good or a service associated with the order to be delivered to the vehicle after performing the first action.

BRIEF DESCRIPTION OF THE DRAWINGS

FIGS. 1A and 1B are diagrams of an overview of an example implementation described herein;

FIG. 4 is a flow chart of an example process for order identification and fulfillment based on vehicle monitoring; and FIG. 5 is another flow chart of another example process for order identification and fulfillment based on vehicle monitoring.

DETAILED DESCRIPTION

The following detailed description of example implementations refers to the accompanying drawings. The same reference numbers in different drawings may identify the same or similar elements.

An individual may place an order online through an organization's website and may drive to a physical location of the organization to receive delivery of the order (e.g., to pick up a good and/or receive a service that was ordered). The process for receiving delivery of the order may be time consuming for the individual, waste fuel resources of a vehicle of the individual, may reduce safety by impeding traffic flow at the location while the individual waits for delivery of the order, and/or the like by including lengthy wait times for the individual and/or being inefficient. For example, an employee responsible for delivering the order may not have information related to an expected arrival time of the individual and, as a result, may not be capable of pre-staging the delivery prior to the individual's arrival, thereby introducing significant delay into delivery of the good and/or the service when the individual arrives at the physical location of the organization.

Some implementations described herein provide a vehicle monitoring system that is capable of monitoring vehicles near a third party location (e.g., of a third party, such as an organization, an individual, or a governmental entity) and identifying orders related to the vehicles. In this way, the vehicle monitoring system facilitates efficient delivery of a good and/or a service to an individual for an order. This reduces an amount of time needed to complete delivery of the pick-up order to the individual when the individual arrives at the third party location. In addition, this conserves fuel resources of a vehicle associated with the individual by reducing an amount of time that the vehicle needs to idle while awaiting delivery of the order to the individual after the individual arrives at the third party location. Further, this conserves time of an employee of the third party and/or facilitates more efficient time management related to completing delivery of the order by facilitating pre-staging of a good and/or a service for delivery prior to arrival of the individual. Further, this improves a throughput of the third party with respect to completing deliveries of orders in an amount of time. Further, this reduces vehicle congestion at the third party location, thereby improving a vehicle flow at the third party location and/or improving safety at the third party location (e.g., by creating a safer environment for pedestrians, by reducing traffic congestion that would impede access to the third party location by emergency personnel, etc.).

Figure 1B:
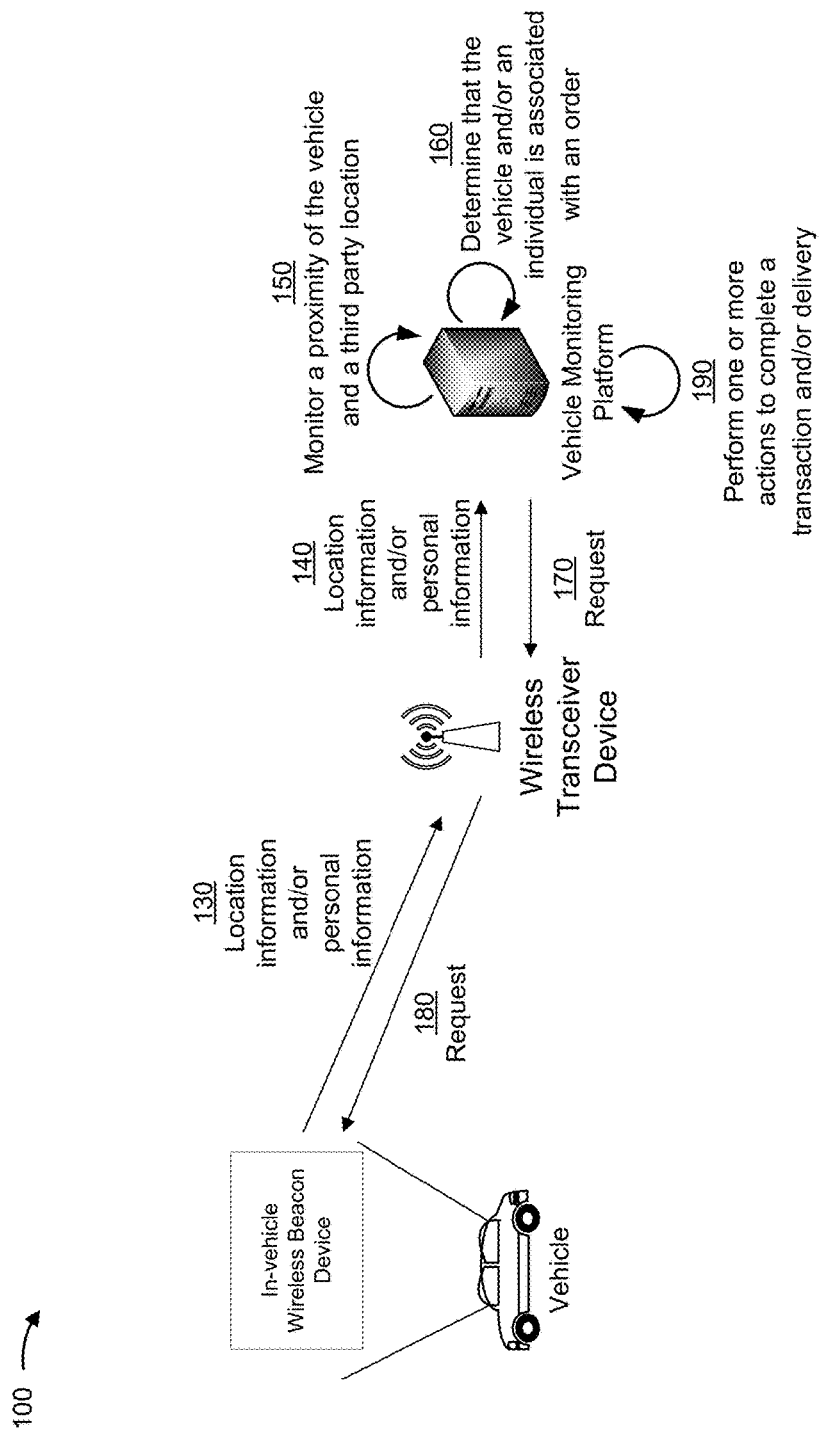

FIGS. 1A and 1B are diagrams of an overview of an example implementation 100 described herein. As shown, implementation 100 includes a third party location, a set of wireless transceiver devices associated with the third party location, a vehicle, and a vehicle monitoring system (not shown in FIG. 1A).

As shown by reference number 110, the third party location (e.g., a retail location for a retailer, such as a grocery store for a grocery store chain, an inventory yard, a building, a fuel station, etc.), may be associated with a set of wireless transceiver devices. As further shown, the set of wireless transceiver devices may be located around the third party location. For example, the set of wireless transceiver devices may be on-premises at the third party location (e.g., may be located at entrances to a parking lot for the third party location, at the edges of the property of the third party location, etc.). Additionally, or alternatively, and as another example, the set of wireless transceiver devices may be located off-premises (e.g., may be located along a road near the third party location, at an intersection near the third party location, etc.).

As shown by reference number 120, a vehicle may be traveling near the third party location and within communicative proximity of the wireless transceiver devices. The vehicle may be configured with an in-vehicle wireless beacon device, or another type of device, that is capable of providing information to the set of wireless transceiver devices. For example, the in-vehicle wireless beacon device may be configured as part of an infotainment system of the vehicle, may be mounted on the frame of the vehicle or within the body of the vehicle, and/or the like.

In some implementations, the in-vehicle wireless beacon device may be a separate device (e.g., may be an aftermarket device, may not be configured as part of the vehicle, etc.). For example, the in-vehicle wireless beacon device may be a device that can be attached to the frame of the vehicle, to the body of the vehicle, within the cabin of the vehicle (e.g., to a sun visor, to a windshield, etc.) via an attachment mechanism (e.g., a magnet, hook and loop fasteners, a clip, etc.), that can be placed in a cup holder of the vehicle, and/or the like. The in-vehicle wireless beacon device may connect to an infotainment system of the vehicle and/or to a user device of a user of the vehicle via a wireless connection (e.g., a Bluetooth connection), via a universal serial bus (USB) port associated with the infotainment system and/or the user device, via an auxiliary (AUX) connection, and/or the like.

The in-vehicle wireless beacon device may be configured to provide location information that identifies a location of the vehicle and/or personal information that identifies the vehicle, an owner of the vehicle, a user of the vehicle, an order associated with the vehicle and/or the user of the vehicle, and/or the like. For example, the in-vehicle wireless beacon device may receive location information for the vehicle from a navigation application associated with an infotainment system associated with the vehicle, from a user device associated with a user of the vehicle (e.g., from a navigation application installed on the user device), and/or the like and may provide the location information to a wireless transceiver device.

Additionally, or alternatively, the in-vehicle wireless beacon device may determine location information for the vehicle based on output from a global positioning system (GPS) component of the in-vehicle wireless beacon device, the infotainment system, and/or the user device and may provide the location information to a wireless transceiver device. Additionally, or alternatively, the in-vehicle wireless beacon device may communicate with a wireless transceiver device to notify the wireless transceiver device of the presence of the in-vehicle wireless beacon device. In this case, the wireless transceiver device may have a known location and the vehicle monitoring system may approximate the location of the vehicle based on the location of the wireless transceiver device and/or based on other information received from the in-vehicle wireless beacon device and/or determined by a wireless transceiver device, such as a signal strength of a wireless signal from the in-vehicle wireless beacon device, whether other wireless transceiver devices are in communication with the in-vehicle wireless beacon device, a signal strength of a signal received from the in-vehicle wireless beacon device by the other wireless transceiver devices, and/or the like.

Turning to FIG. 1B and as shown by reference number 130, the in-vehicle wireless beacon device may provide, to the wireless transceiver device, location information and/or personal information. For example, the in-vehicle wireless beacon device may provide the location information and/or the personal information as the vehicle moves about within communicative proximity of the wireless transceiver device.

As shown by reference number 140, the wireless transceiver device may provide, to the vehicle monitoring system, the location information and/or the personal information received from the in-vehicle wireless beacon device. For example, the personal information may be stored by the in-vehicle wireless beacon device (e.g., in on-board memory resources of the in-vehicle wireless beacon device), may be received from an infotainment system with which the in-vehicle wireless beacon device is connected (e.g., from memory resources of the infotainment system), as input via a user interface associated with the infotainment system, the user device, and/or the in-vehicle wireless beacon device (e.g., where the user interface was provided for display based on a prompt from the in-vehicle wireless beacon device), may be received from a user device with which the in-vehicle wireless beacon device is connected, and/or the like.

When the personal information is stored by another device, the in-vehicle wireless beacon device may request the personal information from the other device. In this case, the other device may provide a user interface for display that permits a user of the other device to confirm that the personal information is to be provided to the in-vehicle wireless beacon device, to specify which personal information is to be provided, and/or the like (e.g., via selection of a user interface element of the user interface, via input of a voice command, etc.). Continuing, the in-vehicle wireless beacon device may receive the personal information in a message (e.g., a short message service (SMS) message), in a text file, and/or the like.

As shown by reference number 150, the vehicle monitoring system may monitor a proximity of the vehicle to a third party location. For example, the vehicle monitoring system may monitor a distance between the location of the vehicle and the third party location. In some implementations, the wireless transceiver devices may be located on-premises at the third party location (e.g., along a route from an entrance of the third party location to a delivery location of the third party location) so that the vehicle monitoring system can monitor a proximity of the vehicle to the delivery location. Additionally, or alternatively, the wireless transceiver devices may be located off-premises from the third party location (e.g., along a route to the third party location) so that the vehicle monitoring system can monitor a proximity of the vehicle to the third party location (e.g., an entrance of the third party location).

In some implementations, the vehicle monitoring system may monitor a destination and/or a route of the vehicle based on navigation information provided by the in-vehicle wireless beacon device from a navigation application associated with an infotainment system of the vehicle and/or a user device associated with a user of the vehicle. For example, the user of the vehicle may provide a notification to the third party (e.g., to the vehicle monitoring system) that the user is on the way to the third party location. In this case, this may cause the vehicle monitoring system to establish communications with a navigation application of an infotainment system of the vehicle, with a user device associated with the user, and/or the like to facilitate reception of the navigation information (e.g., so that the vehicle monitoring system can monitor a proximity of the vehicle to the third party location). In this case, the vehicle monitoring system may establish the communications via the wireless transceiver devices if the infotainment system and/or the user device are within communicative proximity of the wireless transceiver devices or via a network (e.g., a cellular network, a satellite network, etc.) if the infotainment system and/or the user device are not within communicative proximity of the wireless transceiver devices.

The vehicle monitoring system may determine whether a proximity of the vehicle and the third party location satisfies a threshold (e.g., indicating that the third party location may be a destination of the vehicle). In some implementations, the vehicle monitoring system may periodically communicate with (e.g., ping) a user device associated with a user of the vehicle and/or an infotainment system associated with the vehicle to request confirmation that the vehicle is still enroute to the third party location. In some implementations, a navigation application may automatically determine whether the vehicle is still enroute based on determining whether the vehicle is still travelling on an expected route, whether the vehicle has stopped and been turned off (e.g., based on information from an on-board system of the vehicle), and/or the like. In some implementations, the navigation application may request permission from a user of the user device and/or the infotainment system to confirm, to the vehicle monitoring system, that the vehicle is still enroute to the third party location.

As shown by reference number 160, the vehicle monitoring system may determine that the vehicle and/or an individual associated with the vehicle is associated with an order. For example, the vehicle monitoring system may perform a lookup of personal information in a data structure that includes order information for orders and corresponding personal information for individuals and/or vehicles associated with the orders. The vehicle monitoring system may identify an order when a result of the lookup indicates a match. The vehicle monitoring system may communicate with a server device, a transaction terminal, and/or a transaction backend device associated with online ordering to perform the lookup.

As shown by reference number 170, the vehicle monitoring system may provide, to the wireless transceiver device, a request for confirmation to prepare an order for delivery to the vehicle and/or to complete a transaction related to the order. For example, the vehicle monitoring system may provide the request after determining that the vehicle and/or an individual associated with the vehicle is associated with an order. In some implementations, the request may include information identifying a good and/or a service associated with an order, a price of an order, a scheduled delivery for the order, and/or the like. Continuing with the previous example, when the vehicle monitoring system has determined that the vehicle and/or the individual is associated with an order, the vehicle monitoring system may provide, for display via a user device and/or an infotainment system associated with the in-vehicle, a request for the individual to confirm preparation of an order for delivery.

As shown by reference number 180, the wireless transceiver device may provide, to the in-vehicle wireless beacon device, the request (e.g., for display via an infotainment system of the vehicle, a user device associated with an individual associated with the vehicle, etc.). In this case, the request may be provided to the user device and/or the infotainment system via the in-vehicle wireless beacon device. In some implementations, if the vehicle is not on the premises of the third party location and/or within communicative proximity of the wireless transceiver device, the vehicle monitoring system may provide the request to the user device and/or the infotainment system via a cellular network, a satellite network, and/or the like. In some implementations, the individual may be capable of modifying preparation of the order via a user interface associated with the request. For example, the individual may input, via the user interface associated with the request, a modification to a good and/or a service to be prepared for delivery, a scheduled time for delivery, and/or the like.

As shown by reference number 190, the vehicle monitoring system may perform one or more actions to complete a transaction related to the order and/or to complete a delivery of a good and/or a service to the vehicle (e.g., after receiving a confirmation to complete the transaction and/or the delivery the good and/or the service). For example, the vehicle monitoring system may send a message to a user device associated with an employee of the third party to prepare a good and/or a service for delivery (e.g., to pre-stage delivery of a good and/or a service associated with the order). Additionally, or alternatively, and as another example, the vehicle monitoring system may provide account information for an account to a transaction backend device and/or a transaction terminal to complete the transaction (e.g., prior to the vehicle arriving at the third party location for delivery of the good and/or the service).

In this way, the vehicle monitoring system facilitates performance of various actions prior to a vehicle arriving at a third party location (e.g., prior to arriving on premises at the third party location, prior to arriving at a delivery location of the third party location, etc.) to receive delivery of a good and/or a service associated with an order. This increases an efficiency of delivering a good and/or a service to a vehicle associated with an order at a third party location by reducing an amount of time needed to complete delivery of the good and/or the service (e.g., by reducing an amount of wait time for delivery of the good and/or the service). In addition, this facilitates dynamic real-time delivery processing, thereby improving delivery of a good and/or a service to a vehicle. Further, this conserves processing resources by reducing or eliminating manual operation of devices associated with completing a transaction for an order and/or delivery of a good and/or a service associated with the order.

As indicated above, FIGS. 1A and 1B are provided merely as an example. Other examples are possible and may differ from what was described with regard to FIGS. 1A and 1B.

Figure 2:
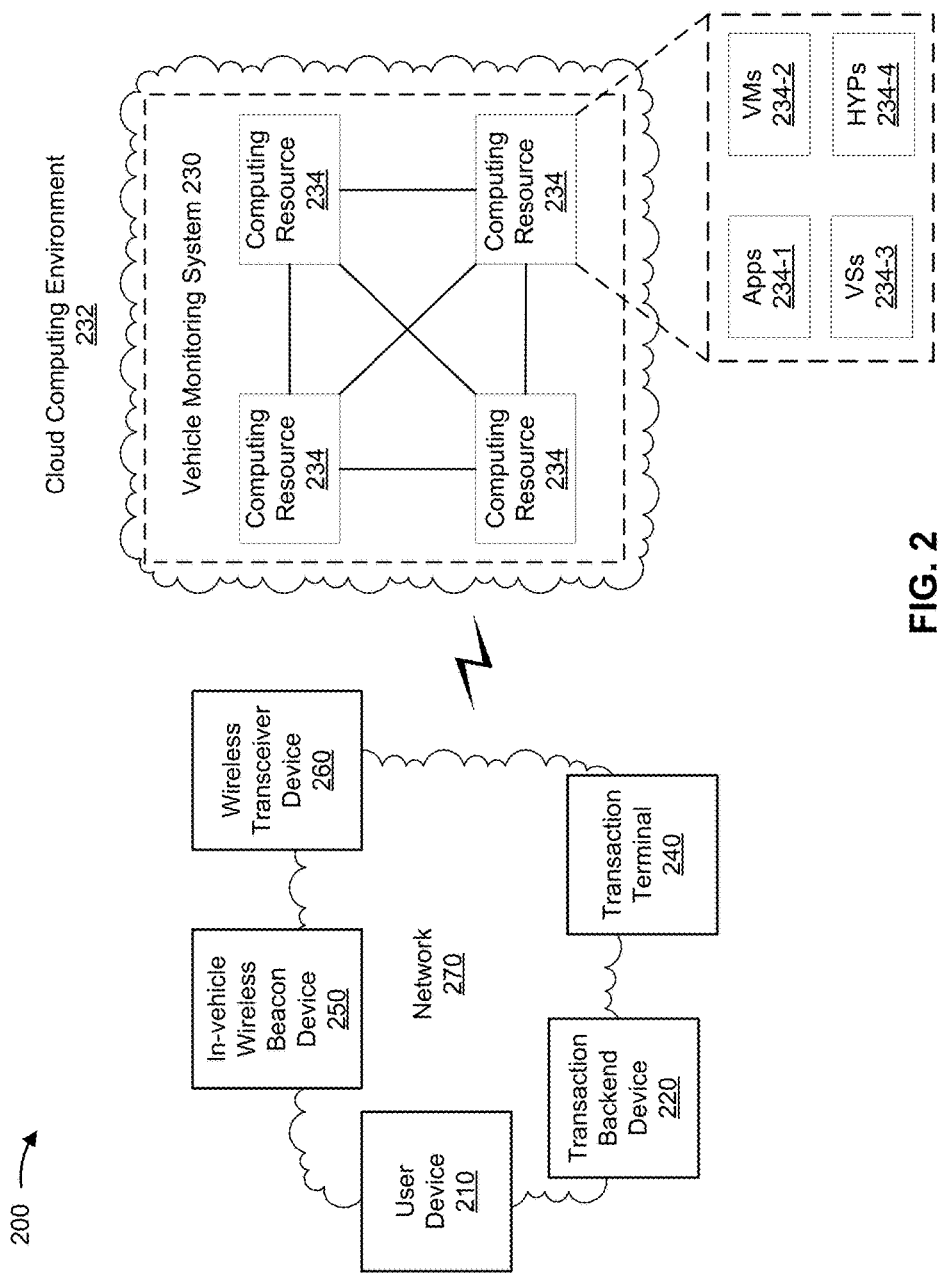
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction backend device 220, a vehicle monitoring system 230 within a cloud computing environment 232 that includes a set of computing resources 234, a transaction terminal 240, an in-vehicle wireless beacon device 250, a wireless transceiver device 260, and a network 270. Devices of environment 200 may interconnect via wired connections, wireless connections, or a combination of wired and wireless connections.

User device 210 includes one or more devices capable of receiving, generating, storing, processing, and/or providing information associated with a user of user device 210, completing a transaction, and/or the like. For example, user device 210 may include a desktop computer, a mobile phone (e.g., a smart phone, a radiotelephone, etc.), a laptop computer, a tablet computer, a handheld computer, a gaming device, a virtual reality device, a wearable communication device (e.g., a smart wristwatch, a pair of smart eyeglasses, etc.), or a similar type of device. Additionally, or alternatively, and as an additional example, user device 210 may include a head unit, an infotainment system, and/or the like associated with a vehicle. In some implementations, user device 210 may receive, from vehicle monitoring system 230, a request to confirm that a user of user device 210 is ready for delivery of an order from at a third party location, as described elsewhere herein. Additionally, or alternatively, user device 210 may provide, to vehicle monitoring system 230, a confirmation that a user of user device 210 is ready for delivery of an order at a third party location and/or may provide confirmation to complete a transaction related to the order, as described elsewhere herein.

Transaction backend device 220 includes one or more devices capable of authorizing and/or facilitating a transaction. For example, transaction backend device 220 may include one or more servers and/or computers to store and/or provide information associated with processing a transaction via transaction terminal 240. In some implementations, transaction backend device 220 may process account information to complete a transaction for an order to be delivered to a vehicle, as described elsewhere herein.

Transaction backend device 220 may include one or more devices associated with a financial institution (e.g., a bank, a lender, a credit union, etc.) and/or a transaction card association that authorizes a transaction and/or facilitates a transfer of funds or payment between an account associated with a cardholder of a transaction card and an account of an individual or business associated with transaction terminal 240. For example, transaction backend device 220 may include one or more devices of one or more issuing banks associated with a cardholder of a transaction card, one or more devices of one or more acquiring banks (or merchant banks) associated with transaction terminal 240, and/or one or more devices associated with one or more transaction card associations (e.g., VISA®, MASTERCARD®, and/or the like) associated with a transaction card. Accordingly, based on receiving information associated with a transaction card from transaction terminal 240, devices of transaction backend device 220 (e.g., associated with a financial institution or transaction card association) may communicate to authorize a transaction and/or transfer funds between the accounts associated with a transaction card and/or transaction terminal 240.

Transaction backend device 220 may provide or deny authorization associated with a transaction. For example, transaction backend device 220 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with a transaction card and/or provided by transaction terminal 240.

Transaction backend device 220 may include one or more devices associated with a rewards program associated with a transaction card and/or an entity (e.g., a financial institution, a merchant, a service provider, a vendor, and/or the like) associated with a transaction card and/or transaction terminal 240. For example, transaction backend device 220 may authorize the earning and/or redemption of rewards (e.g., rewards points associated with a transaction card, cash rewards, client loyalty rewards associated with an entity associated with transaction terminal 240, and/or the like) based on a transaction processed by transaction terminal 240.

Vehicle monitoring system 230 includes one or more devices capable of receiving, generating, storing, processing, and/or providing information associated with an order that is to be delivered to a vehicle at a third party location. For example, vehicle monitoring system 230 may include a cloud server or a group of cloud servers, a set of cameras, a set of wireless transceiver devices 260, a set of transaction terminals 240, a set of transaction backend devices 220, a set of user devices 210, and/or the like. In some implementations, vehicle monitoring system 230 may be designed to be modular such that certain software components can be swapped in or out depending on a particular need. As such, vehicle monitoring system 230 may be easily and/or quickly reconfigured for different uses.

In some implementations, as shown in FIG. 2, vehicle monitoring system 230 may be hosted in cloud computing environment 232. Notably, while implementations described herein describe vehicle monitoring system 230 as being hosted in cloud computing environment 232, in some implementations, vehicle monitoring system 230 may not be cloud-based (i.e., may be implemented outside of a cloud computing environment) or may be partially cloud-based.

Cloud computing environment 232 includes an environment that hosts vehicle monitoring system 230. Cloud computing environment 232 may provide computation, software, data access, storage, and/or other services that do not require end-user knowledge of a physical location and configuration of a system and/or a device that hosts vehicle monitoring system 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host vehicle monitoring system 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with vehicle monitoring system 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Transaction terminal 240 includes one or more devices capable of facilitating processing of a transaction associated with a transaction card and/or an account. For example, transaction terminal 240 may include a point-of-sale (PoS) terminal, a payment terminal (e.g., a credit card terminal, a contactless payment terminal, a mobile credit card reader, a chip reader, etc.), a security access terminal, an ATM terminal, and/or the like. In some implementations, transaction terminal 240 may receive account information to complete a transaction related to an order to be delivered to a vehicle (e.g., from user device 210, vehicle monitoring system 230, and/or the like, as described elsewhere herein. Additionally, or alternatively, transaction terminal 240 may provide the account information to transaction backend device 220 to complete the transaction, as described elsewhere herein.

In some implementations, transaction terminal 240 may include one or more input components and/or output components to facilitate obtaining information from a transaction card (e.g., an account number of an account associated with a transaction card, an expiration date of a transaction card, etc.), input (e.g., a personal identification number (PIN), a signature, biometric information, etc.), from a cardholder of a transaction card, related to completing and/or authorizing a transaction, and/or the like. In some implementations, example input components of transaction terminal 240 may include a number keypad, a touchscreen, a magnetic strip reader, a chip reader, a pen and corresponding signature pad, a radio frequency (RF) signal reader, and/or the like.

In some implementations, a magnetic strip reader of transaction terminal 240 may receive data from a transaction card as a magnetic strip of the transaction card is swiped along the magnetic strip reader. In some implementations, a chip reader of transaction terminal 240 may receive data from a transaction card via an integrated circuit chip (e.g., a EUROPAY®, MASTERCARD®, VISA® (EMV) chip) of a transaction card when the chip is placed within communicative proximity of the chip reader. In some implementations, an RF signal reader of transaction terminal 240 may enable a contactless transaction from a transaction card by obtaining data wirelessly from the transaction card as the transaction card comes within communicative proximity of transaction terminal 240, such that the RF signal reader detects an RF signal from an RF antenna of the transaction card. In some implementations, transaction terminal 240 may communicate with in-vehicle wireless beacon device 250 and/or user device 210 to complete a transaction. For example, transaction terminal 240 may be included as part of a drive-through at a third party location, may be mounted above a delivery area at the third party location, and/or the like so that transaction terminal 240 can wirelessly communicate with in-vehicle wireless beacon device 250 and/or user device 210 when a vehicle is present at the third party location, as described elsewhere herein.

In some implementations, example output components of transaction terminal 240 may include a display, a speaker, a printer, a light, and/or the like. In some implementations, transaction terminal 240 may use an output component to output information related to a transaction (e.g., an indication to cause a user to input information to authorize a transaction, information that identifies whether a transaction was completed, etc.).

In-vehicle wireless beacon device 250 includes one or more devices capable of receiving, storing, generating, processing, and/or providing information related to a vehicle and/or a user of the vehicle to vehicle monitoring system 230. For example, in-vehicle wireless beacon device 250 may include a wireless beacon device, a head unit device (e.g., of an infotainment system in the vehicle), an infotainment system, a wireless transceiver (or separate receiver and transmitter), a transponder, a repeater, and/or the like associated with a vehicle (e.g., mounted on or in the vehicle). In some implementations, in-vehicle wireless beacon device 250 may provide, to vehicle monitoring system 230, personal information and/or location information related to a vehicle associated with in-vehicle wireless beacon device 250 and/or a user of the vehicle, as described elsewhere herein. Additionally, or alternatively, in-vehicle wireless beacon device 250 may receive, from vehicle monitoring system 230, a request to confirm that a user of the vehicle is ready for delivery of an order, as described elsewhere herein.

Wireless transceiver device 260 includes one or more devices capable of receiving, generating, storing, processing, and/or providing information related to a vehicle. For example, wireless transceiver device 260 may include a transceiver, a separate transmitter and receiver, one or more sensors (e.g., configured to detect a location of a vehicle, a speed of the vehicle, an image of the vehicle, a direction of travel of the vehicle, etc.). In some implementations, wireless transceiver device 260 may receive information from a vehicle (e.g., information to be used to determine whether the vehicle is associated with an order), as described elsewhere herein. Additionally, or alternatively, wireless transceiver device 260 may provide the information to vehicle monitoring system 230, as described elsewhere herein.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
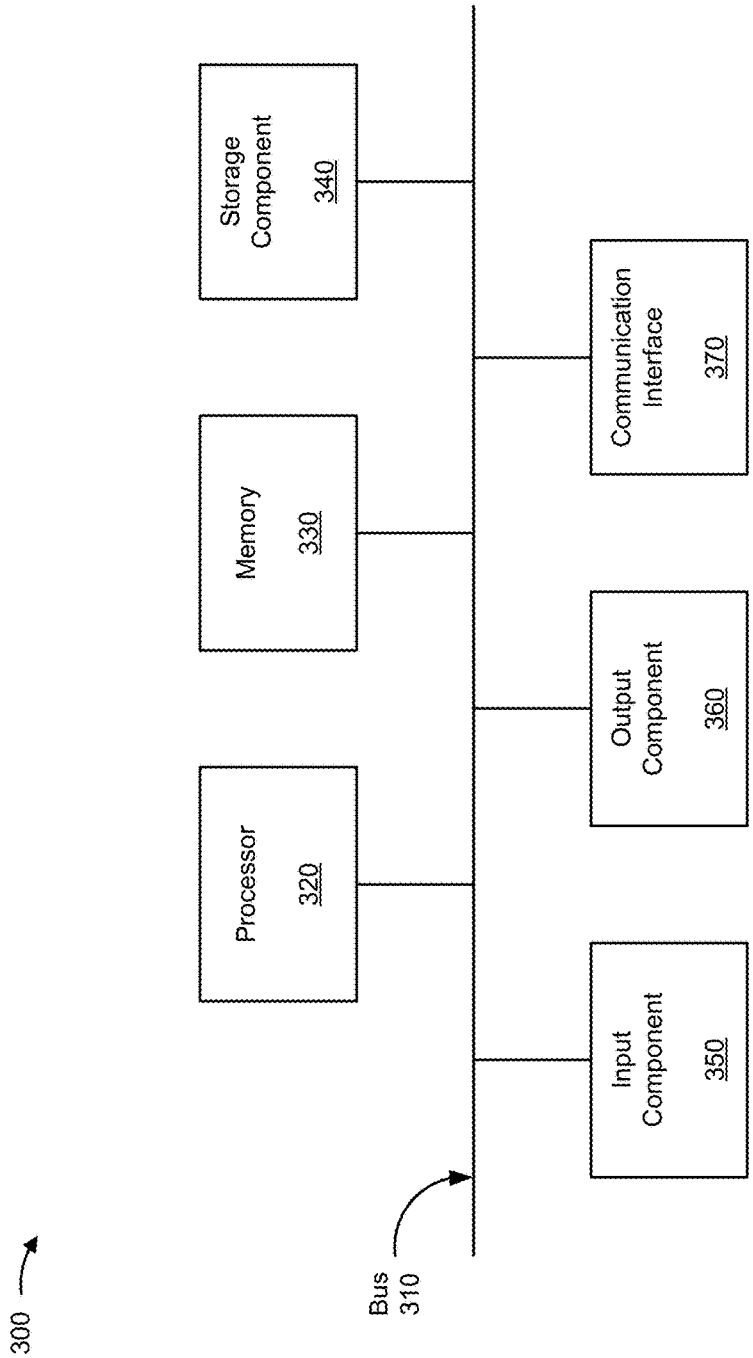
FIG. 3 is a diagram of example components of one or more devices of FIG. 2.

FIG. 3 is a diagram of example components of a device 300. Device 300 may correspond to user device 210, transaction backend device 220, vehicle monitoring system 230, computing resource 234, transaction terminal 240, and/or in-vehicle wireless beacon device 250. In some implementations, user device 210, transaction backend device 220, vehicle monitoring system 230, computing resource 234, transaction terminal 240, in-vehicle wireless beacon device 250, and/or wireless transceiver device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for order identification and fulfillment based on vehicle identification. In some implementations, one or more process blocks of FIG. 4 may be performed by vehicle monitoring system 230. In some implementations, one or more process blocks of FIG. 4 may be performed by another device or a group of devices separate from or including vehicle monitoring system 230, such as user device 210, transaction backend device 220, transaction terminal 240, in-vehicle wireless beacon device 250, and wireless transceiver device 260.

As shown in FIG. 4, process 400 may include monitoring, based on location information, a proximity of a vehicle and a third party location using a set of sensors associated with the third party location (block 410). For example, vehicle monitoring system 230 may monitor, based on location information, a proximity of a vehicle and a third party location using a set of sensors associated with the third party location. In some implementations, a vehicle may include a car, a bus, a truck, a drone, a plane, a train, a boat, a bicycle, a motorcycle, autonomous versions of any of the previously listed vehicles, and/or the like. In some implementations, a sensor may include wireless transceiver device 260, a camera, a reader (e.g., a barcode reader, a radio frequency identifier (RFID) reader, etc.), and/or the like.

In some implementations, location information may identify a location of a vehicle and/or a sensor associated with vehicle monitoring system 230. For example, the location information may identify a set of coordinates for a vehicle and/or a sensor, a name of a location (e.g., of a road, of an intersection, of a city, etc.) of the vehicle and/or a sensor, a destination of the vehicle, a particular third party location with which a sensor is associated (e.g., a particular retail location, a particular entrance to a third party location, etc.), and/or the like. In some implementations, vehicle monitoring system 230 may receive location information from in-vehicle wireless beacon device 250, a navigation system associated with a vehicle, user device 210 associated with a user of the vehicle, wireless transceiver device 260 associated with vehicle monitoring system 230, and/or the like. In some implementations, vehicle monitoring system 230 may receive location information periodically, according to a schedule, based on requesting location information, and/or the like.

In some implementations, vehicle monitoring system 230 may monitor a location of a vehicle based on in-vehicle wireless beacon device 250 associated with the vehicle being within communicative proximity of wireless transceiver device 260 of vehicle monitoring system 230 (e.g., based on receiving location information from in-vehicle wireless beacon device). For example, vehicle monitoring system 230 may monitor a location of a vehicle based on wireless transceiver device 260 associated with vehicle monitoring system 230 receiving a signal from in-vehicle wireless beacon device 250. Additionally, or alternatively, vehicle monitoring system 230 may monitor a location of a vehicle based on a unique identifier (e.g., displayed by an ornament, such as a decal, a sticker, a magnet, etc. on the exterior of the vehicle) associated with the vehicle being within a field of view of a camera associated with vehicle monitoring system 230. For example, a camera associated with vehicle monitoring system 230 may capture an image and may process the image captured by the camera using an image processing technique, such as a computer vision technique, a feature detection technique, and/or an optical character recognition (OCR) technique, to identify a unique identifier, such as a unique alphanumeric sting or another identifier, in the image.

In some implementations, vehicle monitoring system 230 may determine a proximity of a vehicle to a third party location. For example, vehicle monitoring system 230 may determine a proximity between the vehicle and the third party location based on location information. In some implementations, vehicle monitoring system 230 may determine a proximity between a vehicle and a third party location by determining a distance between a location of the vehicle and the third party location. For example, vehicle monitoring system 230 may determine, on a digital map, the location of the vehicle relative to the third party location based on the location information and may determine the proximity of the vehicle and the third party location after determining the location of the vehicle relative to the third party location on the digital map (e.g., by performing a search of the location of the vehicle and the third party location on the digital map and determining a distance between the location of the vehicle and the third party location).

In some implementations, vehicle monitoring system 230 may monitor a proximity of a vehicle and a third party location. For example, vehicle monitoring system 230 may determine a proximity of the vehicle and the third party location periodically, according to a schedule, in real-time, and/or the like (e.g., when in-vehicle wireless beacon device 250 is communicatively coupled to wireless transceiver device 260 of vehicle monitoring system 230).

In some implementations, vehicle monitoring system 230 may determine a priority of monitoring the vehicle relative to monitoring one or more other vehicles based on the proximity of the vehicle and the third party location relative to another proximity of each of the one or more other vehicles and the third party location (e.g., where the priority indicates a likelihood that the vehicle or another vehicle are associated with a pick-up order). For example, vehicle monitoring system 230 may monitor a proximity for a first vehicle relative to a second vehicle based on one or more factors, such as based on the first vehicle having a closer proximity to the third party location relative to the second vehicle, based on the location information indicating that the third party location is the destination of the first vehicle, based on the first vehicle traveling in a direction of the third party location (e.g., rather than in a direction away from the third party location), and/or the like. In some implementations, vehicle monitoring system 230 may determine a priority for a vehicle relative to another vehicle based on a score for the vehicle and/or the other vehicle. For example, vehicle monitoring system 230 may determine a score based on the one or more factors described above (e.g., where scores for different factors are weighted differently, are averaged, are summed, etc.).

In some implementations, vehicle monitoring system 230 may determine a priority of vehicles in a queue for delivery of orders (e.g., based on an ordering of the vehicles in the queue). For example, vehicle monitoring system 230 may determine an order of vehicles in a queue based on a signal strength of a signal from corresponding in-vehicle wireless beacon devices 250 received by wireless transceiver device 260 at a delivery location of the third party location (e.g., where a higher relative signal strength indicates a closer proximity to wireless transceiver device 260 and, subsequently, to the delivery location). Additionally, or alternatively, vehicle monitoring system 230 may use another type of sensor, such as a camera or a reader device, to determine an order of a vehicle in a queue. For example, vehicle monitoring system 230 may capture images of an ornament on the exterior of the vehicles that displays a unique identifier for the vehicles and may process the images to identify the unique identifier and/or the order of the vehicles.

Additionally, or alternatively, multiple sensors may be installed along a route to the third party location (e.g., on premises at the third party location and/or off premises from the third party location). For example, vehicle monitoring system 230 may identify an order of vehicles in a queue based on wireless transceiver devices 260 with which in-vehicle wireless beacon devices 250 are interacting, or have interacted, (e.g., particular wireless transceiver devices 260 with which in-vehicle wireless beacon devices 250 are interacting or have interacted, a signal strength of a signal received by different wireless transceiver devices 260 from a particular in-vehicle wireless beacon device 250 when in-vehicle wireless beacon device 250 is broadcasting a signal to the different wireless transceiver devices 260, etc.). Additionally, or alternatively, and as another example, vehicle monitoring system 230 may determine which reader devices (e.g., an RFID reader device, a Quick Response (QR) code reader device, etc.) have detected a tag or decal for the vehicle along a route, thereby indicating a location of the vehicle along the route relative to other vehicles (e.g., where different reader device have detected tags or decals for the other vehicles). In this way, vehicle monitoring system 230 may monitor an order of a vehicle in a queue, thereby facilitating accurate prediction of the arrival of the vehicle at the third party location (or a delivery location of the third party location).

In some cases, in-vehicle wireless beacon device 250 may be handed off between wireless transceiver devices 260 when traveling along a route to a third party location and/or to a delivery location of the third party location. For example, a first wireless transceiver device 260 may hand off in-vehicle wireless beacon device 250 to a second wireless beacon device 250 (e.g., when a signal strength of a signal from in-vehicle wireless beacon device 250 satisfies a threshold, based on a direction of travel of the vehicle as determined from navigation information, etc.). Continuing with the previous example, the first wireless transceiver device 260 may communicate with the second wireless transceiver device 260 to hand off in-vehicle wireless beacon device 250 to the second wireless transceiver device 260 (e.g., by providing information identifying in-vehicle wireless beacon device 250 to the second wireless transceiver device 260, by providing a set of instructions to the second wireless transceiver device 260 to communicate with in-vehicle wireless beacon device 250, etc.).

Additionally, or alternatively, and continuing still with the previous example, the first wireless transceiver device 260 may perform the hand-off by communicating with in-vehicle wireless beacon device 250 (e.g., by providing information identifying the second wireless transceiver device 260 to in-vehicle wireless beacon device 250, by providing a set of instructions to in-vehicle wireless beacon device 250 to cause in-vehicle wireless beacon device 250 to communicate with the second wireless transceiver device 260, etc.). In some implementations, hand-offs of in-vehicle wireless beacon device 250 and/or user device 210 may occur in a similar manner with respect to handing off those devices to and/or from a base station associated with a cellular network 270 (e.g., when the vehicle arrives at the premises of the third party location and/or leaves the premises of the third party location).

In some implementations, vehicle monitoring system 230 may determine that the proximity of the vehicle and the third party location satisfies a threshold. For example, vehicle monitoring system 230 may determine to request and/or process additional information (e.g., personal information) related to the vehicle and/or an individual associated with the vehicle based on the proximity satisfying a threshold. This conserves processing resources of vehicle monitoring system 230 and/or another device with which vehicle monitoring system 230 would need to communicate by preventing vehicle monitoring system 230 from performing additional processing until a proximity of a vehicle and a third party location satisfies a threshold.

In this way, vehicle monitoring system 230 may monitor a proximity of a vehicle and a third party location prior to processing personal information.

As further shown in FIG. 4, process 400 may include processing, based on the proximity of the vehicle and the third party location, personal information to determine that an order is associated with the vehicle and/or an individual associated with the vehicle (block 420). For example, vehicle monitoring system 230 may process, based on the proximity of the vehicle and the third party location, personal information to determine that an order is associated with the vehicle and/or an individual associated with the vehicle. Conversely, vehicle monitoring system 230 may monitor vehicles that are associated with an order (e.g., rather than monitoring all vehicles in communicative proximity to wireless transceiver device 260). This reduces a quantity of vehicles that vehicle monitoring system 230 has to monitor, thereby conserving processing resources of vehicle monitoring system 230 associated with monitoring vehicles. In some implementations, an order may include an order for a good and/or a service where the good and/or the service is to be delivered to a vehicle. For example, an order may include an in-store pick-up order (e.g., where the order was placed online), a drive-through order, an order for fuel for a vehicle, an order for maintenance for a vehicle, and/or the like.

In some implementations, vehicle monitoring system 230 may receive personal information, such as an account identifier that identifies an account, a user identifier that identifies a user of a vehicle and/or user device 210, and/or an order identifier that identifies an order, from in-vehicle wireless beacon device 250 and/or user device 210 (e.g., via wireless transceiver device 260 associated with vehicle monitoring system 230). For example, the personal information may be stored by in-vehicle wireless beacon device 250, may be stored by an infotainment system of a vehicle and requested from the infotainment system by in-vehicle wireless beacon device 250, stored by user device 210 and requested by in-vehicle wireless beacon device 250, and/or the like. Continuing with the previous example, in-vehicle wireless beacon device 250 may be paired with the infotainment system and/or with user device 210 and may receive the personal information via a wireless connection between in-vehicle wireless beacon device 250 and the infotainment system or user device 210.

In some implementations, when the personal information is stored by an infotainment system and/or user device 210, in-vehicle wireless beacon device 250 may request the personal information from the infotainment system and/or user device 210 (e.g., from an application via which an individual placed the order). For example, the request may prompt the infotainment system and/or user device 210 to provide a notification for display that requests input of confirmation to provide the personal information, that permits modification to the personal information that is provided, and/or the like.

In some implementations, vehicle monitoring system 230 may receive personal information based on requesting the personal information (e.g., when vehicle monitoring system 230 determines that a proximity of the vehicle and the third party location satisfies a threshold), based on providing a set of instructions to in-vehicle wireless beacon device 250 to provide the personal information, based on providing an indication, for display, to in-vehicle wireless beacon device 250 and/or user device 210 to request that a user of the vehicle confirm or opt-in to providing the personal information, and/or the like. Additionally, or alternatively, vehicle monitoring system 230 may determine personal information by processing metadata associated with a communication received from in-vehicle wireless beacon device 250 (e.g., metadata associated with location information), by processing an image of an ornament (e.g., a decal, a sticker, a magnet, etc.) that displays a unique identifier (e.g., a unique alphanumeric string, a barcode, etc.) for the vehicle to identify the vehicle, and/or the like.

In some implementations, personal information may identify the vehicle and/or an individual associated with the vehicle. For example, personal information may include a unique identifier for the vehicle (e.g., displayed by a removable ornament located on the exterior of the vehicle), a vehicle identification number (e.g., a VIN), a serial number of in-vehicle wireless beacon device 250 associated with the vehicle, a name of an individual that owns the vehicle, a name of an individual associated with a particular user device 210 that is communicatively coupled to an infotainment system of the vehicle (e.g., via a Bluetooth connection, a universal serial bus (USB) connection, etc.), an identifier of user device 210 connected to the infotainment system, a name of an individual input via a user interface (e.g., of user device 210 associated with a user of the vehicle, of an infotainment system of the vehicle, of in-vehicle wireless beacon device 250 associated with the vehicle), and/or the like.

In some implementations, in-vehicle wireless beacon device 250 may be communicatively coupled to an infotainment system of the vehicle (e.g., which may be communicatively coupled to user device 210), such as when in-vehicle wireless beacon device 250 is an aftermarket device (e.g., rather than configured on a frame or in the body of the vehicle, as part of the infotainment system, etc.). For example, in-vehicle wireless beacon device 250 may be communicatively coupled via a wireless connection, such as Bluetooth connection, and/or a wired connection, such as a USB connection.

In some implementations, vehicle monitoring system 230 may perform a lookup of the personal information in a data structure. For example, the data structure may include order information for a set of orders and corresponding personal information for the set of orders. Continuing with the previous example, order information may identify an order, an individual associated with an order, a good and/or a service associated with an order, a vehicle to which a good and/or a service associated with an order is to be delivered, and/or the like. In some implementations, vehicle monitoring system 230 may determine that the individual and/or the vehicle is associated with the order based on a result of the lookup (e.g., where a result of the lookup indicates a match between personal information and order information).

In some implementations, vehicle monitoring system 230 (e.g., wireless transceiver device 260 of vehicle monitoring system 230 may capture an image of a vehicle associated with an order). For example, vehicle monitoring system 230 may provide the image for display via user device 210 associated with an employee of a third party (e.g., to facilitate identification of the vehicle by the employee). In some implementations, vehicle monitoring system 230 may analyze the image to identify a color of the vehicle, a make and/or model of the vehicle, and/or the like and may provide this information for display via user device 210 associated with an employee of the third party. For example, vehicle monitoring system 230 may use one or more image processing techniques to identify this information, such as a feature extraction technique to identify edges of the vehicle shown in the image to identify a make and/or model of the vehicle, to identify colors of the vehicle after the vehicle has been identified in the image, and/or the like.

In this way, vehicle monitoring system 230 may process personal information prior to receiving confirmation to complete a transaction for the order.

As further shown in FIG. 4, process 400 may include receiving, after determining that the vehicle and/or the individual are associated with the order and via a device associated with the vehicle and/or the individual, confirmation to complete a transaction for the order (block 430). For example, vehicle monitoring system 230 may receive, after determining that the vehicle and/or the individual are associated with the order and via a device associated with the vehicle (e.g., user device 210 and/or in-vehicle wireless beacon device 250) and/or the individual, confirmation to complete a transaction for the order.

In some implementations, vehicle monitoring system 230 may receive confirmation to complete a transaction for the order after requesting confirmation to complete the transaction. In some implementations, to request confirmation, vehicle monitoring system 230 may provide, to user device 210 and/or in-vehicle wireless beacon device 250 (or infotainment system), a notification that indicates that the individual and/or the vehicle is associated with the order. For example, vehicle monitoring system 230 may provide the notification for display. Continuing with the previous example, the notification may be associated with a user interface that permits a user of user device 210 and/or in-vehicle wireless beacon device 250 to provide confirmation to complete a transaction. In some implementations, vehicle monitoring system 230 may receive an indication of a selection of a user interface element (e.g., a button, a menu option, a toggle, etc.) associated with the notification by the individual. For example, the selection may indicate confirmation to complete a transaction related to the order.

In this way, vehicle monitoring system 230 may receive confirmation to complete a transaction prior to performing a first action to complete the transaction.

As further shown in FIG. 4, process 400 may include performing a first action to complete the transaction after receiving the confirmation to complete the transaction (block 440). For example, vehicle monitoring system 230 may perform a first action to complete the transaction after receiving the confirmation to complete the transaction.

In some implementations, vehicle monitoring system 230 may provide, to transaction terminal 240, information related to completing the transaction for the order. For example, vehicle monitoring system 230 may provide account information to transaction terminal 240, such as information that identifies an account associated with the vehicle and/or an individual associated with the vehicle, a transaction card number associated with a transaction card associated with an account, a PIN for an account, a security token related to an account, a username/password combination for an account, and/or the like. In some implementations, vehicle monitoring system 230 may receive the account information from in-vehicle wireless beacon device 250 and/or user device 210 (e.g., via a sensor, such as wireless transceiver device 260). In some implementations, the account information and/or other information related to completing the transaction may be provided via a secure protocol, such as via hypertext transfer protocol secure (HTTPS). This improves a security of completing a transaction via use of secure protocols to complete the transaction.

Additionally, or alternatively, transaction terminal 240 may be installed in an area of the third party location where a good and/or a service is to be delivered. In this case, transaction terminal 240 may be included in vehicle monitoring system 230 and may receive account information directly from in-vehicle wireless beacon device 250 and/or user device 210 rather than receiving the account information from vehicle monitoring system 230. This conserves processing resources of vehicle monitoring system 230 by reducing or eliminating a need for vehicle monitoring system 230 to provide account information to transaction terminal 240.

In some implementations, vehicle monitoring system 230 may cause an application installed on user device 210 and/or in-vehicle wireless beacon device 250 to open (e.g., by providing a set of instructions to user device 210 and/or in-vehicle wireless beacon device 250). For example, the user interface may be associated with facilitating input of account information to complete a transaction related to an order and user device 210 and/or in-vehicle wireless beacon device 250 may provide the input to vehicle monitoring system 230 (e.g., via wireless transceiver device 260).

In some implementations, vehicle monitoring system 230 may receive, from user device 210, a security token related to completing the transaction. For example, the security token may indicate to transaction terminal 240 and/or transaction backend device 220 that an owner of an account has granted transaction terminal 240 and/or transaction backend device 220 permission to charge an account for an order. In some implementations, vehicle monitoring system 230 may provide, to transaction terminal 240 and/or transaction backend device 220, the security token to complete the transaction.

In some implementations, vehicle monitoring system 230 may receive, from transaction terminal 240 and/or transaction backend device 220, a notification that the transaction has been completed. In some implementations, vehicle monitoring system 230 may provide the notification to in-vehicle wireless beacon device 250 and/or user device 210 for display.

In this way, vehicle monitoring system 230 may perform a first action to complete the transaction prior to performing a second action to facilitate a good and/or a service to be delivered to the vehicle.

As further shown in FIG. 4, process 400 may include performing a second action to facilitate a good and/or a service associated with the order to be delivered to the vehicle in association with performing the first action (block 450). For example, vehicle monitoring system 230 may perform a second action to facilitate a good and/or a service associated with the order to be delivered to the vehicle in association with performing the first action.

In some implementations, vehicle monitoring system 230 may generate a work order related to delivering the good and/or the service to the vehicle and/or may provide the work order to user device 210 associated with the third party for display after generating the work order. For example, the work order may include instructions for a worker to pre-stage a location (e.g., a loading dock, a maintenance bay, etc.) for delivery of the good and/or the service, to deliver the good and/or the service to the vehicle, and/or the like. Additionally, or alternatively, vehicle monitoring system 230 may provide, to a robot, a set of instructions related to causing the robot to deliver the good and/or the service to the vehicle.

In some implementations, vehicle monitoring system 230 may receive schedule information from an electronic calendar associated with a user of the vehicle (e.g., from user device 210, from a server device that hosts the electronic calendar, etc.). For example, the schedule information may identify a time at which the vehicle is expected to arrive at the third party location. Additionally, or alternatively, vehicle monitoring system 230 may receive similar information from a navigation application installed on user device 210 and/or associated with the vehicle. For example, the navigation application may provide information that identifies a destination of the vehicle, a road on which the vehicle is traveling, an average rate of speed at which the vehicle is traveling, and/or the like. In some implementations, vehicle monitoring system 230 may determine an expected time of arrival for the vehicle based on the information from the navigation application and/or based on the schedule information. For example, vehicle monitoring system 230 may determine whether the vehicle is on-schedule, whether the vehicle is expected to arrive within a threshold amount of time of an expected time, and/or the like.

In some implementations, vehicle monitoring system 230 may generate a work order to have the good and/or the service ready for delivery to the vehicle at the expected time based on the schedule information and/or the information from the navigation application. This reduces waste or spoilage associated with delivering a good and/or a service via more accurate prediction of an arrival of the vehicle. In addition, this facilitates more efficient management of delivery of goods and/or services to various vehicles and/or conserves pre-staging area resources through more accurate prediction of an arrival of the various vehicles.

In some implementations, vehicle monitoring system 230 may activate a digital sign that displays directions related to directing the vehicle to a location associated with delivering the good and/or the service to the vehicle. For example, vehicle monitoring system 230 may activate a digital sign to cause the digital sign to provide, for display directions to a maintenance bay, a loading dock, a fuel station, and/or the like associated with the third party location. Additionally, or alternatively, vehicle monitoring system 230 may cause a gate to open, so that the vehicle can enter or exit a location (e.g., the third party location, a particular location within the third party location, etc.). Additionally, or alternatively, vehicle monitoring system 230 may monitor the vehicle to identify when the vehicle leaves the third party location to record a timestamp for when delivery of the order has been completed. Additionally, or alternatively, vehicle monitoring system 230 may provide a notification to in-vehicle wireless beacon device 250 and/or user device 210 that the order has been completed and/or may provide a receipt for display to in-vehicle wireless beacon device 250 and/or user device 210.

Additionally, or alternatively, vehicle monitoring system 230 may send navigation instructions to the vehicle and/or to user device 210 of the vehicle's user to direct the vehicle and/or the user to a pick-up location. For example, in the case of an autonomous vehicle, the navigation instructions may cause the autonomous vehicle to navigate to a particular location.

Additionally, or alternatively, vehicle monitoring system 230 may activate an output component to indicate to a user of the vehicle that the good and/or the service has been delivered. For example, vehicle monitoring system 230 may activate a light, a speaker, a digital sign, and/or the like to indicate that the good and/or the service has been delivered.

In this way, vehicle monitoring system 230 may perform a second action to facilitate a good and/or a service to be delivered to the vehicle.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is another flow chart of an example process 500 for order identification and fulfillment based on vehicle identification. In some implementations, one or more process blocks of FIG. 5 may be performed by in-vehicle wireless beacon device 250. In some implementations, one or more process blocks of FIG. 5 may be performed by another device or a group of devices separate from or including in-vehicle wireless beacon device 250, such as user device 210, transaction backend device 220, vehicle monitoring system 230, transaction terminal 240, and wireless transceiver device 260.

As shown in FIG. 5, process 500 may include broadcasting personal information that identifies a vehicle and/or an individual associated with the vehicle (block 510). For example, in-vehicle wireless beacon device 250 may broadcast personal information that identifies a vehicle and/or an individual associated with the vehicle.

In some implementations, in-vehicle wireless beacon device 250 may broadcast personal information periodically, according to a schedule, based on receiving a request from vehicle monitoring system 230 (e.g., via in-vehicle wireless beacon device 250, via a cellular network 270, via user device 210, via an infotainment system, etc.), and/or the like. Additionally, or alternatively, in-vehicle wireless beacon device 250 may receive an instruction from user device 210 and/or an infotainment system associated with the vehicle to start broadcasting the personal information. For example, a user of user device 210 and/or the infotainment system may select, via a user interface of user device 210 and/or the infotainment system, a user interface element to cause an instruction to be provided to in-vehicle wireless beacon device 250. This provides a user of the vehicle associated with in-vehicle wireless beacon device 250 control over when personal information is broadcasted, thereby increasing a security of the personal information.

In some implementations, in-vehicle wireless beacon device 250 may provide the personal information over a dedicated wireless connection (e.g., rather than broadcast the information). For example, in-vehicle wireless beacon device 250 may connect to vehicle monitoring system 230 (e.g., one or more wireless transceiver devices 260 of vehicle monitoring system 230) and may provide the personal information via the wireless connection.

In some implementations, the personal information may be encrypted. For example, the personal information may encrypted using a hash function, a public key associated with vehicle monitoring system 230 and/or the third party, and/or the like. This increases a security of the personal information by reducing or eliminating a capability of devices and/or systems other than vehicle monitoring system 230 from accessing the personal information.

In this way, in-vehicle wireless beacon device 250 may broadcast personal information prior to receiving a request to complete a transaction.

As further shown in FIG. 5, process 500 may include receiving, based on a proximity of the vehicle and a sensor associated with a third party location satisfying a threshold, a request to complete a transaction related to an order (block 520). For example, in-vehicle wireless beacon device 250 may receive, based on a proximity of the vehicle and a sensor associated with a third party location satisfying a threshold, a request to complete a transaction related to an order. In some implementations, in-vehicle wireless beacon device 250 may receive the request from vehicle monitoring system 230, transaction terminal 240, and/or transaction backend device 220.

In some implementations, in-vehicle wireless beacon device 250 may receive the request when a proximity of the vehicle with which in-vehicle wireless beacon device 250 is associated and the third party location satisfies a threshold, when an amount of time between a current time and an expected time of arrival of the vehicle and/or delivery of a good and/or a service satisfies a threshold, after vehicle monitoring system 230 receives an indication from in-vehicle wireless beacon device 250 that the vehicle is enroute to the third party location, and/or the like.

In some implementations, in-vehicle wireless beacon device 250 may provide the request for display (e.g., via a display associated with user device 210 and/or an infotainment system associated with the vehicle). For example, by providing the request for display, in-vehicle wireless beacon device 250 may cause a user interface to be provided for display that permits a user of user device 210 and/or the infotainment system to select a user interface element to confirm completion of the transaction.

Additionally, or alternatively, in-vehicle wireless beacon device 250 may determine to provide an instruction to complete the transaction based on a destination of the vehicle. For example, in-vehicle wireless beacon device 250 may determine to provide the instruction based on information from a navigation application installed on user device 210 and/or an infotainment system of the vehicle that identifies the third party location as the destination of the vehicle. Additionally, or alternatively, and as another example, in-vehicle wireless beacon device 250 may determine to provide the instruction based on the vehicle being on a route that has historically been used by the vehicle and/or other vehicles to travel to the third party location (e.g., based on information from a navigational application).

In some implementations, in-vehicle wireless beacon device 250 may provide, to vehicle monitoring system 230, a confirmation to complete the transaction. Additionally, or alternatively, user device 210 may generate a security token to be used to complete the transaction and user device 210 may provide the security token to vehicle monitoring system 230 via in-vehicle wireless beacon device 250 and/or wireless transceiver device 260 and/or may provide the security token to vehicle monitoring system 230 and/or transaction backend device 220 (e.g., via wireless transceiver device 260, network 270, etc.). For example, the security token may permit vehicle monitoring system 230 to communicate with transaction terminal 240 and/or transaction backend device 220 to complete a transaction using an account associated with the vehicle and/or a user of the vehicle. Additionally, or alternatively, in-vehicle wireless beacon device 250 may provide, to vehicle monitoring system 230, an indication for the third party to start preparing the order for delivery to the vehicle (e.g., based on a proximity of the vehicle and the third party location satisfying a threshold).

In this way, in-vehicle wireless beacon device 250 may receive a request to complete a transaction prior to providing a security token that indicates a confirmation to complete the transaction.

As further shown in FIG. 5, process 500 may include providing a security token that indicates a confirmation to complete the transaction related to the order and/or that is to be used to complete the transaction (block 530). For example, in-vehicle wireless beacon device 250 may provide a security token that indicates a confirmation to complete the transaction related to the order and/or that is to be used to complete the transaction. In some implementations, in-vehicle wireless beacon device 250 may provide the security token to vehicle monitoring system 230, transaction terminal 240, and/or transaction backend device 220.

In some implementations, in-vehicle wireless beacon device 250 may provide the security token after receiving confirmation to provide the security token. For example, in-vehicle wireless beacon device 250 may receive an indication that a user of user device 210 and/or an infotainment system of the vehicle has selected to confirm completion of the transaction prior to providing the security token. Additionally, or alternatively, in-vehicle wireless beacon device 250 may provide account information for an account to be used to complete the transaction.

In some implementations, in-vehicle wireless beacon device 250 may provide, for display via user device 210 and/or an infotainment system of the vehicle, a notification that the security token has been provided. Additionally, or alternatively, in-vehicle wireless beacon device 250 may provide other output via an output component to indicate that the security token has been provided. For example, in-vehicle wireless beacon device 250 may activate a light, a speaker, and/or the like to provide the output. In some implementations, in-vehicle wireless beacon device 250 may receive confirmation that a transaction has been completed (e.g., from transaction terminal 240, transaction backend device 220, and/or vehicle monitoring system 230) and may provide information that identifies the confirmation for display.

In this way, in-vehicle wireless beacon device 250 may provide a security token related to completing a transaction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In some implementations, different situations may impact when various devices perform the implementations described herein. For example, when a vehicle is at the premises of a third party location, in-vehicle wireless beacon device 250 may perform particular functions, such as communicating with vehicle monitoring system 230 via wireless transceiver device 260 to facilitate more granular monitoring, such as monitoring of a position of a vehicle in a queue of vehicles. Conversely, when the vehicle is located off-premises from a third party location, user device 210 and/or an infotainment system associated with the vehicle may communicate with vehicle monitoring system 230 via a cellular network 270. For example, in-vehicle wireless beacon device 250 may be out of range of wireless transceiver device 260, the vehicle may be moving at too high of a rate of speed for in-vehicle wireless beacon device 250 to connect to, and effectively communicate with, wireless transceiver device 260, and/or the like.

Additionally, or alternatively, and as an additional example, user device 210 and/or an infotainment system associated with a vehicle may communicate directly with vehicle monitoring system 230 via wireless transceiver device 260 when information stored by user device 210 and/or the infotainment system is needed and/or requested by vehicle monitoring system 230 (e.g., rather than providing the information to in-vehicle wireless beacon device 250 so that in-vehicle wireless beacon device 250 can provide the information to vehicle monitoring system 230 via wireless transceiver device 260, thereby conserving processing resources of in-vehicle wireless beacon device 250.

In this way, vehicle monitoring system 230 and in-vehicle wireless beacon device 250 may communicate to intelligently manage delivery of a good and/or a service to a vehicle. This improves an efficiency of delivering the good and/or the service to the vehicle by reducing an amount of wait time associated with delivering the good and/or the service, by improving throughput related to completing delivery of orders, and/or by facilitating pre-emptive actions related to fulfilling an order. In addition, this conserves fuel resources of a vehicle to which a good and/or a service is to be delivered by reducing an amount of time that the vehicle has to idle while waiting for a good and/or a service to be delivered. Further, this conserves processing resources of devices associated with processing a transaction for an order to be delivered to a vehicle by facilitating communication among the devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, to:
        monitor, based on location information, a proximity of a vehicle and a third party location of a third party using a set of sensors associated with the third party location,
            the location information having been received from a wireless beacon device associated with the vehicle,
            the location information identifying a location of the vehicle and the third party location;
        request, based on the proximity of the vehicle and the third party location meeting a threshold, personal information to determine that an order is associated with the vehicle or an individual is associated with the vehicle;
        receive the personal information from the wireless beacon device,
            the wireless beacon device broadcasting the personal information that identifies the vehicle or the individual associated with the vehicle;
        determine a priority of the vehicle in a queue associated with delivery of the order,
            the priority of the vehicle in the queue being based on an order of vehicles in the queue,
                the order of the vehicles in the queue being based on a signal strength from wireless beacon devices associated with the vehicles at a delivery location of the third party location;
        receive, after determining that the vehicle or the individual is associated with the order and via another device associated with the vehicle or the individual, confirmation to complete a transaction for the order;
        perform a first action to complete the transaction after receiving the confirmation to complete the transaction,
        where the one or more processors, when performing the first action, are to:
            cause an application installed on the another device to open based on a selection of a notification by the individual after providing the notification for display,
                the application including a user interface related to confirming completion of the transaction related to the order,
                    the user interface allowing the individual to modify the order; and
        perform a second action to facilitate a good or a service associated with the order to be delivered to the vehicle in association with performing the first action.

2. The device of claim 1, where the one or more processors, when requesting the personal information, are to:
    perform a lookup of the personal information in a data structure that includes order information for a set of orders and corresponding personal information for the set of orders after monitoring the proximity of the vehicle and the third party location; and
    determine that the individual or the vehicle is associated with the order, of the set of orders, based on a result of the lookup.

3. The device of claim 1, where the one or more processors, when receiving the confirmation to complete the transaction, are to:
    receive the confirmation to complete the transaction after providing the notification to the another device.

4. The device of claim 3, where the one or more processors are further to:
    receive an indication of a selection of a user interface element associated with the notification by the individual after providing the notification to the another device for display; and
    where the one or more processors, when receiving the confirmation to complete the transaction, are to:
        receive the confirmation to complete the transaction based on receiving the indication of the selection of the user interface element.

5. The device of claim 1, where the set of sensors includes:
    a set of wireless transceiver devices, or
    a set of cameras.

6. The device of claim 1, where the one or more processors, when performing the first action, are to:
    provide, to a transaction backend device, information related to completing the transaction for the order after receiving the confirmation to complete the transaction.

7. The device of claim 1, where the one or more processors, when performing the second action, are to:
    generate a work order related to delivering the good or the service to the vehicle after performing the first action; and
    provide the work order to a user device associated with the third party for display after generating the work order.

8. A non-transitory computer-readable medium storing instructions, the instructions comprising:

one or more instructions that, when executed by one or more processors, cause the one or more processors to:
monitor, based on location information, a proximity of a vehicle and a third party location of a third party using a set of sensors associated with the third party location,
the location information having been received from a wireless beacon device associated with the vehicle,
the location information identifying a location of the vehicle and the third party location;
request, based on the proximity of the vehicle and the third party location meeting a threshold, personal information to determine that an order is associated with the vehicle or an individual associated with the vehicle;
receive the personal information from the wireless beacon device,
the wireless beacon device broadcasting the personal information that identifies the vehicle or the individual associated with the vehicle;
determine a priority of monitoring the vehicle relative to monitoring one or more other vehicles based on the proximity of the vehicle and the third party location relative to another proximity of each of the one or more other vehicles and the third party location,
the priority indicating a likelihood that the vehicle or the one or more other vehicles are associated with a pick-up order,
the priority being based upon a signal strength from wireless beacon devices associated with the one or more other vehicles at a delivery location of the third party location;
provide, to a device, a notification for display that indicates that the individual or the vehicle is associated with the order after requesting the personal information,
the device being associated with the individual or the vehicle;
receive, after providing the notification for display, confirmation to complete a transaction for the order;
perform a first action to complete the transaction after receiving the confirmation to complete the transaction,
where the one or more processors, when performing the first action, are to:
cause an application installed on the device to open based on a selection of a notification by the individual after providing the notification for display,
the application including a user interface related to confirming completion of the transaction related to the order,
the user interface allowing the individual to modify the order; and
perform a second action to facilitate a good or a service associated with the order to be delivered to the vehicle in association with performing the first action.

9. The non-transitory computer-readable medium of claim 8, where the one or more instructions, when executed by the one or more processors, further cause the one or more processors to:
capture an image of an ornament of the vehicle based on the proximity of the vehicle and the third party location satisfying a threshold;
process the image to identify a unique identifier displayed on the ornament after capturing the image of the ornament; and
where the one or more instructions, that cause the one or more processors to request the personal information, cause the one or more processors to:
request the personal information after processing the image,
the personal information including the unique identifier.

10. The non-transitory computer-readable medium of claim 8, where the one or more instructions, that cause the one or more processors to monitor the proximity, further cause the one or more processors to:
determine, on a digital map, the location of the vehicle relative to the third party location based on the location information; and
determine the proximity of the vehicle and the third party location after determining the location of the vehicle relative to the third party location on the digital map.

11. The non-transitory computer-readable medium of claim 8, where the one or more instructions, that cause the one or more processors to perform the first action, cause the one or more processors to:
receive, from the device, a security token related to completing the transaction after receiving the confirmation to complete the transaction; and
provide, to a transaction backend device, the security token to complete the transaction after receiving the security token.

12. The non-transitory computer-readable medium of claim 8, where the one or more instructions, that cause the one or more processors to perform the second action, cause the one or more processors to:
provide, to a robot, a set of instructions related to causing the robot to deliver the good or the service to the vehicle in association with performing the first action.

13. The non-transitory computer-readable medium of claim 8, where the one or more instructions, when executed by the one or more processors, further cause the one or more processors to:
cause a gate to open so that the vehicle can enter or exit the third party location.

14. A method, comprising:
monitoring, by a device and based on location information, a proximity of a vehicle and a third party location of a third party using a set of sensors associated with the third party,
the location information having been received from a wireless beacon device associated with the vehicle,
the location information identifying a location of the vehicle or the third party location;
determining, by the device, that the proximity of the vehicle and the third party location satisfies a threshold based on monitoring the proximity of the vehicle and the third party location;
requesting, by the device, personal information to determine that an order is associated with the vehicle or an individual associated with the vehicle based on determining that the proximity of the vehicle and the third party location satisfies the threshold;
receiving, by the device, the personal information from the wireless beacon device,
the wireless beacon device broadcasting the personal information that identifies the vehicle or the individual associated with the vehicle;

determining, by the device, a priority of the vehicle in a queue associated with delivery of the order,
  the priority of the vehicle in the queue being based on an order of vehicles in the queue,
    the order of the vehicles in the queue being based on a signal strength from wireless beacon devices associated with the vehicles at a delivery location of the third party location;
receiving, by the device and after determining that the vehicle or the individual is associated with the order, confirmation to complete a transaction for the order;
performing, by the device, a first action to complete the transaction after receiving the confirmation to complete the transaction,
where performing the first action includes:
  causing an application installed on another device associated with the vehicle or the individual to open based on a selection of a notification by the individual after providing the notification for display,
    the application including a user interface related to confirming completion of the transaction related to the order,
      the user interface allowing the individual to modify the order; and
performing, by the device, a second action to facilitate a good or a service associated with the order to be delivered to the vehicle after performing the first action.

15. The method of claim 14, further comprising:
receiving schedule information that identifies a time at which the vehicle is expected to arrive at the third party location prior to receiving the confirmation; and
generating a work order to have the good or the service ready for delivery to the vehicle at the time based on the schedule information.

16. The method of claim 14, further comprising:
receiving the location information or the personal information from the wireless beacon device associated with the vehicle.

17. The method of claim 14, where performing the second action comprises:
activating a digital sign that displays directions related to directing the vehicle to another location associated with delivering the good or the service to the vehicle after performing the first action.

18. The method of claim 14, where performing the first action comprises:
providing, to a transaction backend device, a security token related to completing the transaction.

19. The method of claim 18, where performing the first action comprises:
receiving, from the transaction backend device, a notification that the transaction has been completed after providing the security token to the transaction backend device; and
where performing the second action comprises:
providing a work order to another device associated with the third party after receiving the notification, the work order indicating that the third party is to deliver the good or the service to the vehicle.

20. The method of claim 14, further comprising:
causing a gate to open so that the vehicle can enter or exit the third party location.

* * * * *